Sept. 8, 1936.   C. S. VAN SICKLE   2,053,504
SOIL DISRUPTER
Filed Jan. 7, 1936   3 Sheets-Sheet 3
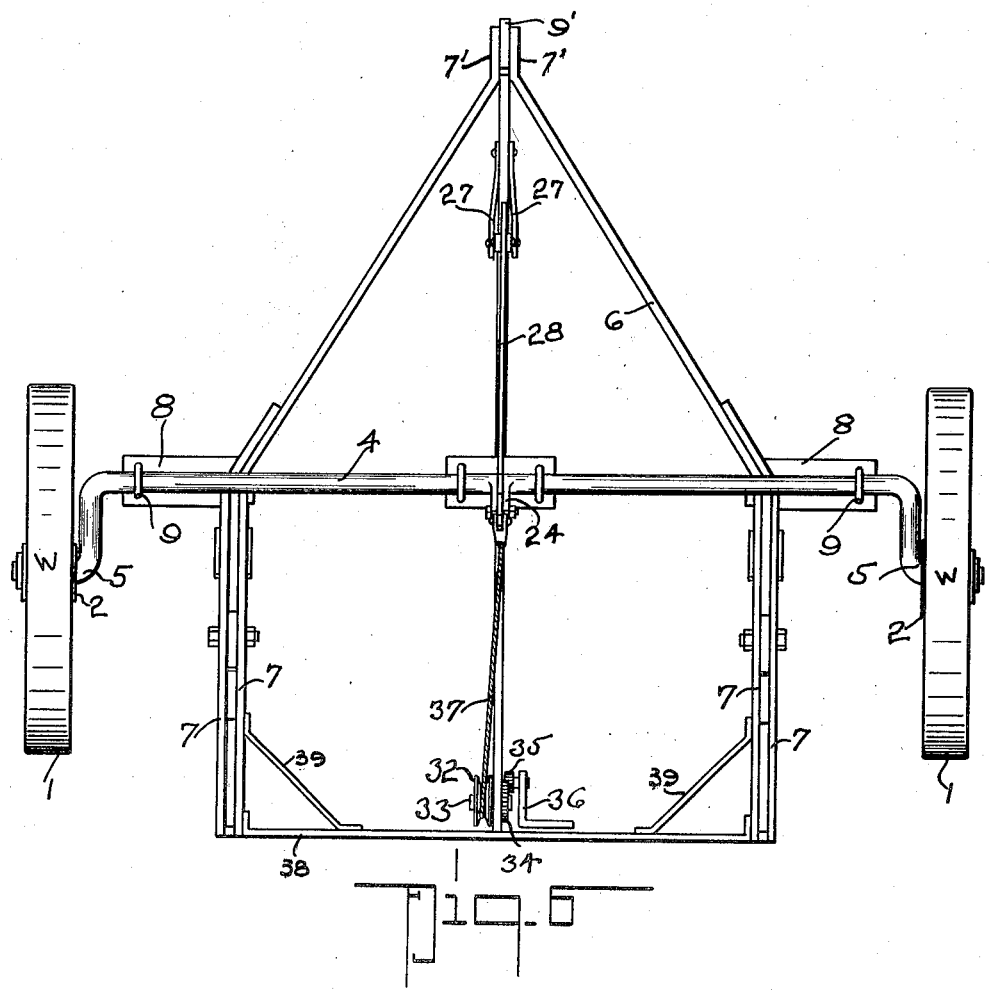
Charles S. Van Sickle
Inventor
By Herbert E. Smith
Attorney Patented Sept. 8, 1936

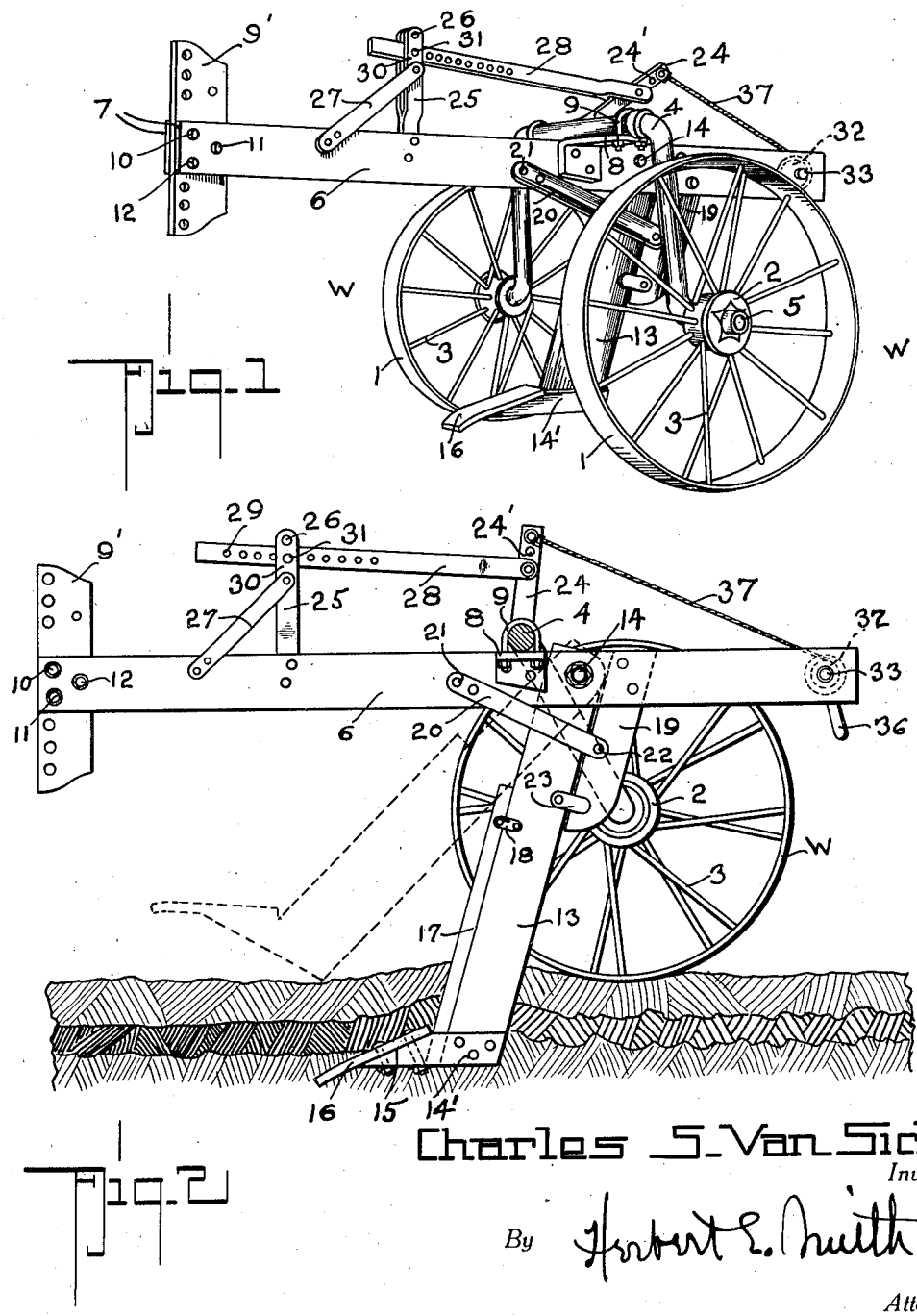

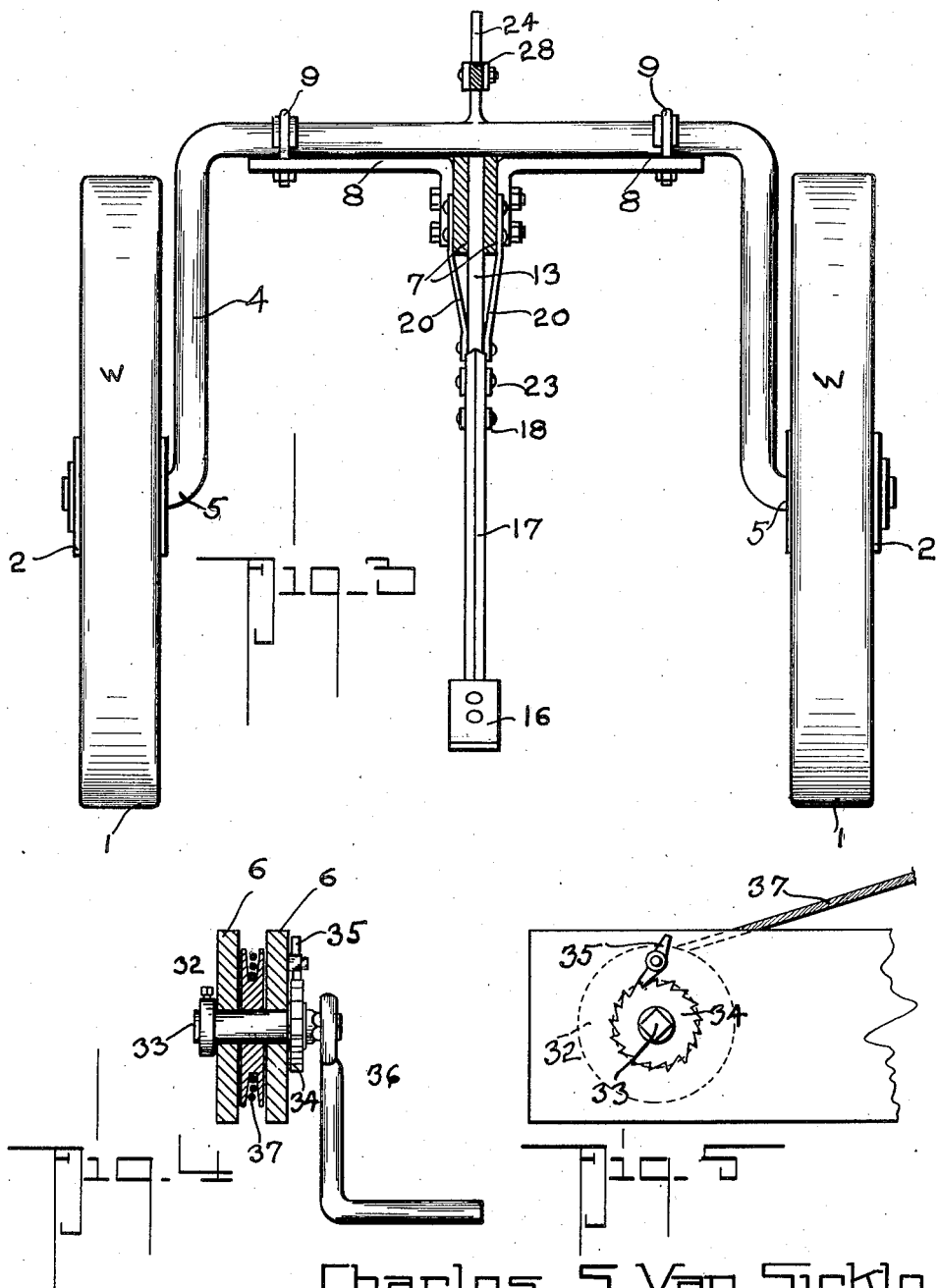

2,053,504

UNITED STATES PATENT OFFICE 2,053,504

SOIL DISRUPTER

Charles S. Van Sickle, Creston, Wash.

Application January 7, 1936, Serial No. 57,884

4 Claims. (Cl. 97—78)

My invention relates to improvements in soil disrupters and more particularly to subsoilers for breaking up the hard-pan under the soft soil to aid in the absorption of moisture and to prevent erosion.

An object of my invention has been to provide a subsoil plow of great sturdiness for its desired purpose, having adjustable features which may be operated simply to raise the plow from contact with the soil when the device is to be moved from one point to another.

A further object of my invention has been the provision of a subsoil disrupter which can be mounted singly or in units of two or more and at the same time be adjustable for gauging the depth of the disruption or, if it is so desired, the plow may be raised clear of the ground surface.

Other objects and advantages of the invention will be apparent during the course of the following description.

In the accompanying drawings forming a part of this specification and in which like numerals are employed to designate like parts throughout the same, Figure 1 is a view in perspective of the device of my invention showing the subsoil plow in elevated position;

Figure 2 is a partial cross sectional view of my subsoiler with the plowshare in the downwardly extended position;

Figure 3 is a vertical cross section of the device taken on line 3—3 of Figure 2;

Figure 4 is a cross section taken on line 4—4 of Figure 2;

Figure 5 is an enlarged view in elevation of the ratchet device used for raising or lowering the plowshare; and Figure 6 is a plan view of my device showing the use of two disrupters mounted in a frame and indicating the raising and lowering means.

In the drawings, wherein for the purpose of illustration I have shown a preferred embodiment of my invention, the letters W—W represent standard steel wheels having a broad tread 1 supported from a central hub 2 by means of spokes 3. A U-shaped axle 4 having outwardly extending wheel shafts 5 is disposed between the wheels for supporting a frame 6 which may comprise a single pair of spaced bars 7, 7 or more, such as shown in Figure 6.

Secured upon this frame and extending outwardly from it are right angular supports 8, 8 and U-bolts 9, 9 are used to securely clamp the axle 4 to the members 8, 8. As best seen in Figure 1, the spaced bars 7 of the frame 6 extend forward of the wheels to form the draft member and at their extreme forward ends support a hitch attachment 9' between the two ends and said hitch attachment is secured by means of bolts 10, 11, and 12. A plow standard 13 disposed between the spaced members 7, 7 extends downwardly and is supported by means of bolts 14, upon which it may pivot. At the lower end of the plow standard 13 I bolt a shoe 14' cut off angularly on its forward end as at 15 and upon this forward angular face 15 I bolt or otherwise secure a cutting face 16 which may be made of steel plate, surfaced with stellite or stubenite to afford a wear-resisting surface.

Upon the forward or leading edge of the plow standard 13 I secure a hardened steel parting strip 17 by means of clips 18. Immediately to the rear and disposed in a manner similar to the plow standard is rigidly mounted a plow support arm 19 against which standard 13 may abut and be supported. A brace 20 between frame 6 and a plow support arm 19, bolted at 21 to the frame 6 and at 22 to member 19, serves to eliminate whip in the plow standard and to provide a solid rest for said standard.

Upon standard 13 I weld a pair of clips 23 which further aid in preventing movement of the standard laterally when it is engaging the support arm 19. Upon the U-shaped axle 4 and at an angle to it I erect an angularly disposed upright arm 24 which has a series of holes as 24' in its upper or outer end.

Between frame bars 7, 7 and forward to the axle I erect a pair of upright arms 25 having holes at their upper ends, as 26. Arms 25 are supported by means of braces 27 between frame 6 and the upper ends of the arms 25. A link 28 having a plurality of holes at its forward end, as 29, is secured at 30 between the uprights 25 and pin 31 engages one of the holes in the uprights 25 securely locking the U-shaped axle 4 in an adjusted position.

At the rear end of the frame I mount a sheave or drum 32 upon the stub shaft 33 and said shaft has secured to it a ratchet 34 into which the dog 35 may be engaged. One end of the shaft 33, as best seen in Figure 4, may be splined and a crank 36 fitted thereon for revolving the sheave or drum 32. A cable 37 secured upon the upper end of arm 24 is also secured about the drum 32.

The device of Figure 6 is a double-plow arrangement embodying the principles of the single plow heretofore described, but in this instance pairs of spaced bars 7, 7 are coupled together by means of a cross member 38 joining their rear ends and suitable braces 39 are used to make the structure more rigid. The forward ends 7' of one bar 7 in each pair are extended forward angularly toward the center line of the machine and are joined to support, between their ends, the hitch attachment 9' which is secured by means of bolts.

Method of operation

In the operation of my device a tractor hitch may be fastened to any one of the holes in the hitch member 9' and while the device is being moved over the roads or across fields the plow standard and shoe, together with the frame, are maintained in their raised position.

When the furrow is to be cut, the pin 31 is loosened and removed from engaging hole 29 of member 28, thus freeing the upright arm 24 on the shaft 4. The dog 35 is withdrawn from the teeth of the ratchet 34 and the cable 37 is thus slacked off. This release permits the frame and the plow standard to swing forward, pivoting upon the hub shaft 5 in the hub 2 of the wheel W. Thus with power applied to the forward end and the device rolled forward the shoe 14' is advanced downwardly and into the soil to a depth of approximately fifteen or sixteen inches.

In making turns with farming implements of this nature, it is often necessary for one wheel to back and the other to advance forward in such a way as to put a strain upon the cultivating shoe. Therefore, I have provided my device so that when pressure to the rear is exerted upon the standard 13 it may pivot upon the bolt 14, swinging to the dotted lines indicated in Figure 2 and thus not strain or injure any portion of my implement.

Referring specifically to Figure 2 it will be noted that the pivot bolt 14 of the plow standard 13 is located slightly to the rear of the point of attachment of the axle 4 upon the frame 6 thus preventing any downward force from being exerted upon the hitch 9'. The forward inclination of the standard 13 disposes the plow shoe 14' ahead of the treads of the wheels, W, W, which shoe, because of the resistance offered by the earth when the plow shoe is down to the operating level of the earth and below the hard pan, tends to cause the rear end of my implement to be pulled downwardly, lifting the forward draft end of the frame, thus overcoming its natural weight and eliminating any undue strain upon the hitch bolts (not shown) and unusual strains upon the tractor or other draft means.

Operating this machine with the shoes 14' in advance of the treads of wheels W, W, serves another and valuable purpose, namely that of clearing the forward or lead edge of the plow standard 13 of trash and grain which would otherwise collect and bunch and thus clog the machine, limiting its efficiency as well as increasing the load upon the source of power.

It is common practice in the use of subsoilers, to operate in stubble fields or fields upon which there is much straw and rubbish. This material collects upon the plow standard to some degree and will form bunches lying crosswise of the standard and extending outwardly on each side parallel to the ground. By disposing the wheels slightly to the rear of the point where the standard 13 emerges from the ground, I have found that the wheel treads will pin this rubbish to the ground, pulling it clear from the plow to continually prevent falling and bunching.

Under very hilly conditions such as exist in many parts of this country it has been found advisable to have a device with wide enough wheel spread so as to have a comparatively low center of gravity and, therefore, I have evolved the double plow arrangement of Figure 6.

It would be entirely possible and within the scope of my invention to mount more plow standards if it should be found advisable. In the device of Figure 6 the plow members are spaced approximately five and one-half feet apart and as furrows of that width are sufficient for the purpose of preventing erosion and allowing maximum absorption of moisture this device will, of course, accomplish twice the work of the device of my Figure 1.

When the plowing has been completed the operator takes up on the cable 37 winding it about the drum by means of the crank 36 and when he has raised his plow and plow frame sufficiently to clear the ground surface he drops the dog 35 back into the teeth of the ratchet 34 and re-engages pin 31 into the nearest hole 29 of the link 28, thus effecting a rigid and solid lock to hold arm 24 in its adjusted position.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

I claim:

1. The combination with a frame, a U-shaped axle mounted on the frame, and wheels on the axle, of a plow supported from said frame and having a removable plow shoe, an angularly disposed arm rigid with said axle, a rotary drum and operating means therefor mounted rearwardly of said axle and connected with said arm for adjusting said axle, and means mounted on said frame forward of said axle, and connected therewith for retaining said axle in adjusted position.

2. The combination with a frame, a U-shaped axle mounted on the frame, and wheels on the axle, of a plow supported from said frame, an angularly disposed arm rigid with said axle, a rotary drum and operating means therefor mounted rearwardly of said axle and connected with said arm for adjusting said axle, and adjustable means mounted forward of said axle on said frame for retaining said axle in adjusted position.

3. The combination with a frame, a U-shaped axle mounted on the frame, and wheels on the axle, of a plow supported from said frame and having a removable plow shoe, an angularly disposed arm rigid with the axle, a rotary drum and operating means therefor mounted rearwardly of said axle and connected with said arm for adjusting said axle, a yoke mounted on said frame forward of said axle, and adjustable means connecting said yoke and said arm for retaining said axle in adjusted position.

4. The combination with a frame, a U-shaped axle mounted on the frame, and wheels on the axle, of a plow supported from said frame, an angularly disposed arm rigid with said axle, a rotary drum and operating means therefor mounted rearwardly of said axle and connected with said arm for adjusting said axle, a yoke mounted forward of said axle on said frame, and adjustable means connecting said yoke and said arm for retaining said axle in adjusted position.

CHARLES S. VAN SICKLE.